United States Patent

[11] 3,574,496

| [72] | Inventor | William Lloyd Hewitt<br>Harbor City, Calif. |
|---|---|---|
| [21] | Appl. No. | 840,994 |
| [22] | Filed | July 11, 1969 |
| [45] | Patented | Apr. 13, 1971 |
| [73] | Assignee | Honeywell Inc.<br>Minneapolis, Minn. |

[54] DIRECT SPARK IGNITER COMBUSTION SAFEGUARD APPARATUS
8 Claims, 2 Drawing Figs.

| [52] | U.S. Cl. | 431/71,<br>431/25, 431/79 |
|---|---|---|
| [51] | Int. Cl. | F23n 5/08 |
| [50] | Field of Search | 431/71, 25,<br>66, 79, 46, 69 |

[56] References Cited
UNITED STATES PATENTS

| 2,648,375 | 8/1953 | Smith et al. | 431/25 |
|---|---|---|---|
| 2,797,745 | 7/1957 | Rowell | 431/25 |
| 3,079,984 | 3/1963 | Wright et al. | 431/66 |
| 3,247,887 | 4/1966 | Matthews | 431/71 |
| 3,399,948 | 9/1968 | Myers et al. | 431/71X |

*Primary Examiner*—Frederick L. Matteson
*Assistant Examiner*—Robert A. Dua
*Attorneys*—Lamont B. Koontz, Francis A. Sirr and Omund R. Dahle

ABSTRACT: A direct spark igniter combustion safeguard system having two flame sensors, a first of these being an ultraviolet responsive sensor positioned to observe the ignition spark and the resulting flame and connected in controlling relation to the gas valve, and the second sensor being of the flame rectification type for controlling igniter turnoff and also controlling a safety timer and lockout switch.

INVENTOR:
WILLIAM LLOYD HEWITT
BY Osmund R. Dahle
ATTORNEY.

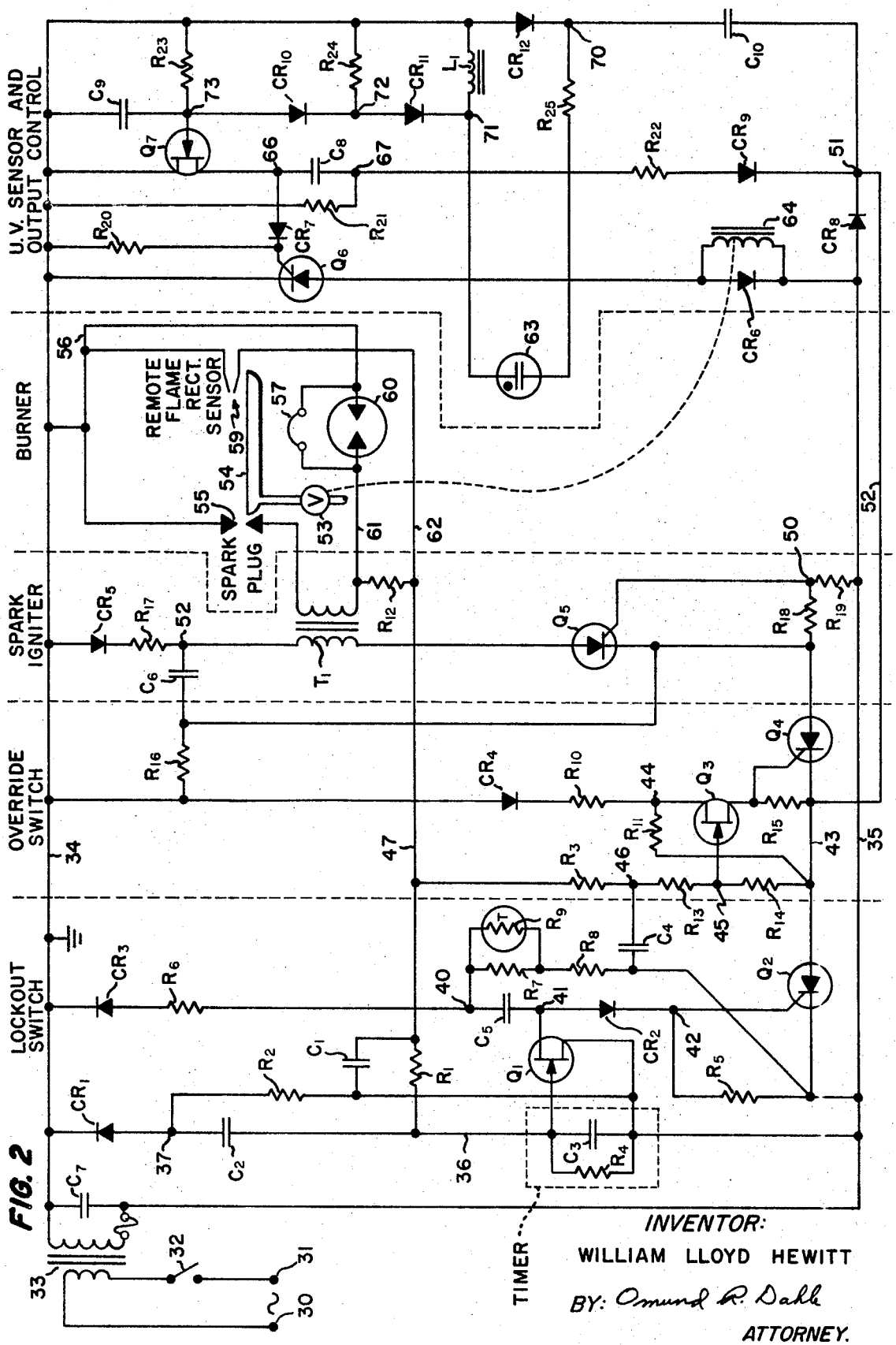

3,574,496

DIRECT SPARK IGNITER COMBUSTION SAFEGUARD APPARATUS

SUMMARY OF THE INVENTION

The invention relates to the art of direct spark igniters and to means to check for the existence of a spark and the establishment and continuity of burner flame. The system is a combustion safeguard system having direct spark ignition in which a timer and a lockout switch controls power through an ignition override switch to a silicon-controlled rectifier spark igniter and also controls power from the timer and lockout to an ultraviolet sensor and output control. When the system is energized on a call for heat, the timer capacitor charges to start a timing function for safety purposes. This supplies the necessary power to the silicon-controlled rectifier spark generator which produces a repetitive ignition spark at a spark plug at the burner. At the same time, the ultraviolet sensor becomes operative and seeing the spark opens a gas valve by means of energizing a relay. The resulting flame is sensed by the ultraviolet sensor to hold open the gas valve. If flame is generated at the burner, a flame rectification sensor is activated and its conduction causes the ignition override switch to turn off the spark ignition. The flame rectification sensor also supplies current to the capacitor of the timer to prevent the timer from turning off the system. An important aspect of the invention is the use of an ultraviolet or optical sensor to monitor the spark and turn on a fuel valve while using a second sensor in the form of a flame rectifier to turn off the spark after the flame has been established and to also disable the timer. In other words, the ultraviolet sensor is used to get the system into operation and the flame rectification sensor is subsequently used to insure that the system will remain in operation.

BRIEF DESCRIPTION OF THE DRAWING

FIG. 2 is a schematic representation of a preferred embodiment of the invention.

DESCRIPTION OF THE PREFERRED EMBODIMENT

Figure 1:
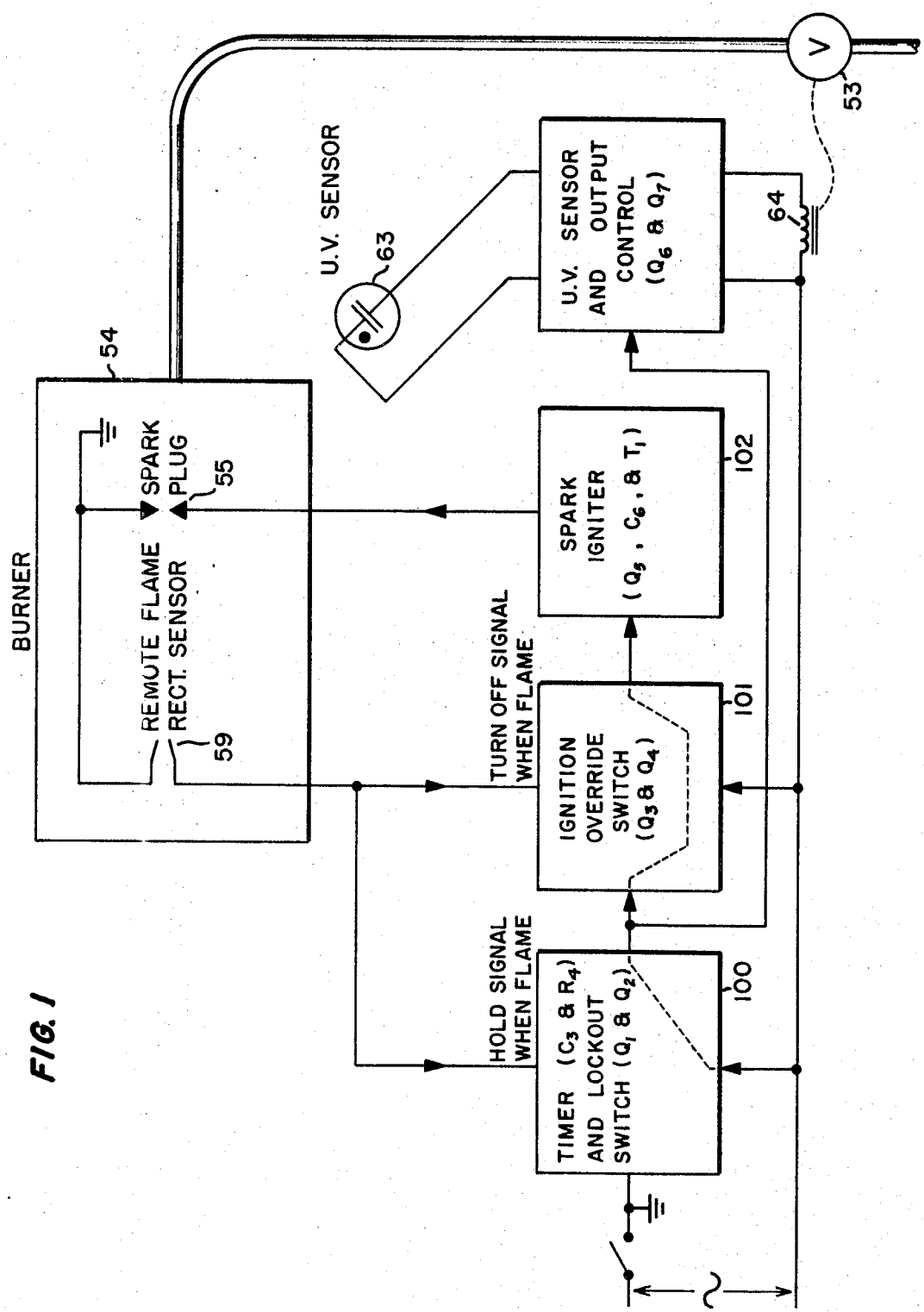
FIG. 1 is a functional block diagram.

The present invention is concerned with a direct spark ignition system in which a main fuel valve means is opened allowing full flow of fuel into a combustion chamber burner unit without a pilot flame. The unique feature of this invention is proof of ignition is provided in a direct spark ignition system by utilizing both a flame rod or flame rectification sensor means and an ultraviolet tube or optical sensor means where when there has been a call for heat, the spark system is energized, but the gas valve will not open until the ultraviolet tube senses the ultraviolet energy being give off by the spark. Proper application of the sensor proves the line of sight to the ignition electrode tips and will therefore not permit the gas valve to open if the spark energy is being dissipated elsewhere in the system.

Referring to the block diagram of FIG. 1, it can be stated that power is supplied to a timed lockout control means 100 including a timer made up of a capacitor and a resistor and to a lockout switch utilizing a field effect transistor and a thyristor. The power supplied to the timer charges the capacitor and this charge controls the field effect transistor and the thyristor to pass power through the lockout switch to an ignition override switch 101 made up of a further field effect transistor and thyristor. The power supplied through the override switch in turn is supplied to ignition pulse-generating means, shown as a spark igniter 102 of the capacitor discharge type utilizing a capacitor, a thyristor and a transformer. The output of the spark ignition is supplied to a spark plug 55 which generates an ignition spark at the burner 54 and in the view of an ultraviolet or optical sensor 63. Also at the burner is a flame rectification type of sensor 59. The ultraviolet sensor supplies a signal to an amplifier and an output control 103, this combination including a field effect transistor and a thyristor. The ultraviolet sensor and output control is supplied with power by way of the lockout switch. The ultraviolet sensor and output control energizes a relay 64 which in turn operates the gas valve to supply fuel to the burner.

The normal function for this apparatus is for a thermostat to close its contacts thereby supplying power to the timer and the lockout switch. The timer capacitor is charged and will remain sufficiently charged to keep the system in operation for about 10 seconds before lockout occurs. Power is further supplied through the lockout switch, and through the ignition override switch to the spark ignition override switch to the spark ignition circuit, which then commences to generate a spark at the spark plug. The power passing through the lockout switch is also supplied to energize the ultraviolet sensor and output control. The ultraviolet sensor senses the existence of ultraviolet at the spark plug and causes the output control to energize the relay to open the gas valve. When the gas valve opens, if a flame is generated, the ultraviolet sensor locks in on this flame to maintain the gas valve open. The flame rectification sensor also senses the existence of the flame and causes a direct current potential to bias both timer and ignition override switch. The direct current potential to the ignition override switch is effective to turn off the power to the spark generator. The rectified power from the flame rectification sensor which is supplied back to the timer keeps the capacitor sufficiently charged so that the lockout switch is not actuated.

If the system is started and no spark is seen by the ultraviolet sensor, the relay does not operate and the gas valve remains shut. No flame rectification current is supplied to the timer and the timer times out, turning off power by means of the lockout switch. If the ultraviolet sensor sees the spark, it opens the relay and supplies gas. If no flame is generated, there is no flame rectification current and the timer timers out, operates the lockout switch and removes power so that the gas valve closes. Also the spark igniter continues to try and ignite as long as the timer functions. It thus becomes apparent that an important consideration in the invention is that two different sensors are utilized to sense the flame. The ultraviolet sensor senses the existence of a spark and then the resulting flame to open and maintain open the gas valve while the flame rectification sensor maintains the system in operation once the flame is generated. In other words, the ultraviolet sensor responding to the spark to open the valve and responding to the flame to maintain the valve is followed by the subsequent continuation of operation of the system by the flame rectification sensor keeping the timer from timing out and operating through the ignition turnoff switch to turn off the spark.

TIMER LOCKOUT

Referring now to FIG. 2 of the drawing, a pair of power input terminals 30 and 31 are intended to be connected to a suitable source of alternating current potential. This potential may be the low voltage normally available in a burner control system, such as 24 volts alternating current. Terminals 30 and 31 are connected by means of a switch 32, which may, if desired, be a condition responsive switch such as a thermostat, to the primary winding of a step-up transformer 33. The secondary winding of transformer 33 energizes a pair of main conductors 34 and 35, conductor 34 being shown as grounded. A first circuit which includes a timing circuit can be traced from the conductor 35 through a capacitor C3, a conductor 36, a capacitor C2, a junction 37 and a current rectifying means shown as diode CR1, to the conductor 34. The diode CR1 is oriented so that current may flow from the conductor 35 to the conductor 34 during the half cycles when conductor 35 is positive. In parallel with the capacitor C3 is a resistive element R4. A resistor R2 is also connected from the junction 37 to the conductor 35. The parallel connected capacitor C3 and resistor R4 form a timer circuit to be discussed in more detail below.

A lockout switch circuit may also be traced from the conductor 35 through a resistor R8, a resistor R7, a resistor R6, and a current-rectifying means, shown as a diode CR3, to the conductor 34. The diode CR3 is connected to have its direction of easy current flow towards conductor 34. A temperature compensating resistor or thermistor R9 is connected in parallel with the resistor R7. From a junction 40 between the resistor R7 and R6 a further circuit may be traced through a capacitor C5, a junction 41, a current-rectifying means, shown as a diode CR2, a junction 41 and resistor R5 to the conductor 35. A field effect transistor Q1 is connected from junction 41 to conductor 35 with its drain electrode being directly connected to junction 41 and its source electrode connected to conductor 35. The gate electrode of field effect transistor Q1 is connected into the timer circuit at conductor 36. The junction 42 is connected to the gate electrode of a thyristor Q2, here shown as a silicon-controlled rectifier. This thyristor Q2 has its cathode connected to the conductor 35 and its anode connected to a conductor 43.

The timer and lockout circuit uses both capacitor discharging and charging to achieve a controlled time period. When the supply is switched on, as by switch 33, the timer runs through a preset time period and, in the absence of commands to the contrary, shuts the system down. This is the lockout condition. The timer, which contains no active components, permits the field effect transistor Q1 in conjunction with its allied circuitry to synchronously switch thyristor Q2 during the timed period. Q1 and Q2 form the lockout switch.

The lockout switch has the function of providing half-wave power to the spark ignition unit, the active components of which are Q3, Q4 and Q5, and to the ultraviolet sensor and output control circuit. This power is removed when the timer times out and lockout occurs.

IGNITION OVERRIDE

An ignition override switch circuit or ignition turnoff which includes another field effect transistor Q3 and another thyristor Q4, may be traced from the conductor 34 through a current-rectifying means, shown as diode CR4, resistor R10, a junction 44, a resistor R11 to the conductor 43. In parallel with the resistor R11 is the output circuit of the FET Q3 and this circuit may be traced from the junction 44 through the field effect transistor from the drain to source and through a resistor R15 to the conductor 43. The gate electrode of transistor Q3 is connected to a junction 45 in a network which can be traced from a conductor 43 through resistor R14, junction 45, resistor R13, junction 46, resistor R3, conductor 47, a resistor R1 to the conductor 36. In this network a capacitor C4 is also connected from the junction 46 to the conductor 35. The conductor 47 is further connected to elements in a burner circuit to be described below. The cathode of a thyristor Q4 is connected directly to the conductor 43 and the gate electrode thereof is connected to the source electrode of field effect transistor Q3 so that the potential developed across R15 operates as a trigger voltage for the thyristor. The anode of the thyristor Q4 is connected by means of a resistor R18, a junction 50, and a resistor R19 to the conductor 35. A further connection to the conductor 43 may be traced from the conductor 35 through a current-rectifying means, here shown as a diode CR8, a junction 51 and a conductor 52 to the conductor 43. The anode of thyristor Q4 is also connected by means of a resistor R16 to the conductor 34. The purpose of the override switch is to switch off the ignition spark when the rectification flame sensor 59 senses a flame, this action taking place independently of the lockout switch.

SPARK IGNITION

A spark ignition circuit may be traced from the conductor 34 to a current-rectifying means, shown as diode CR5, a resistor R17, the primary winding of the high voltage spark transformer T1, from anode to cathode of a thyristor Q5, here shown as a silicon-controlled rectifier, to the anode of thyristor Q4. The gate electrode of Q5 is connected to the junction 50 so that a voltage appearing across R18 will operate as a trigger voltage for Q5. A capacitor C6 is connected from the junction 52 to the cathode of Q5 so that it is in parallel with the primary winding of T1 and thyristor Q5. The spark ignition unit operates by sequentially charging a capacitor C6 and then discharging it through the primary of the spark coil, this action being controlled by Q5.

BURNER

Turning now to the burner section of the drawing, it will be seen that gas is supplied by means of a valve 53 to a burner 54, which burner maybe, if desired, of the elongated or ribbon type. A spark plug 55 is positioned adjacent the burner 54 and receives its energization from the secondary winding of the transformer T1. The circuit may be traced from the upper terminal of the secondary winding of spark transformer T1 across the spark plug 55, through conductor 56, which is grounded, and through the jumper 57 which has in parallel therewith auxiliary spark gap 60, and through a conductor 61 to the lower terminal of the secondary winding of transformer T1. The conductor 61 is also connected by means of a resistor R12 to the conductor 47 which has been described earlier. At the remote end of the burner 54 is located a pair of contacts of a remote flame rectification sensor 59. One of these contacts is directly connected by a conductor 62 to the conductor 47 and the other of the pair of contacts is connected to ground conductor 34. An optical or ultraviolet sensor 63 is positioned to be able to view the spark plug 55 and the flame from burner 54.

OUTPUT CONTROL

Turning now to the ultraviolet sensor and output control portion of FIG. 2, a power circuit may be traced from the conductor 35 through an energizing winding 64 of a relay or solenoid and through a thyristor Q6 from anode to cathode to the ground conductor 34. A protective diode CR6 is connected in parallel with the winding 64 in a conventional manner. A dashed line 65 is shown connecting the solenoid winding 64 in controlling relation to the valve 53, and it is obvious that winding 64 may operate the valve directly or indirectly. A first portion of a biasing circuit for the thyristor Q6 may be traced from the conductor 34 through a field effect transistor Q7 from source to drain, junction 66, capacitor 68, junction 67, resistor 22, current-rectifying means, shown as a diode CR9, to the junction 51. The junction 66 is connected by means of a diode CR7 to the gate electrode of C6, this gate electrode also being connected by a resistor R20 to the conductor 34. The junction 67 is also connected by means of a resistor R21 to the conductor 34. A further voltage doubler circuit may be traced from conductor 34 through a diode CR12, a junction 70 and a capacitor C10 to the junction 51. A further circuit may be traced from the junction 70 through a resistor 25, the ultraviolet sensor 63, junction 71, and an inductor L1 to the conductor 34. A further circuit may be traced from the conductor 34 through a resistor 24, a junction 72, and a diode CR11 to the junction 71. A still further circuit may be traced from conductor 34 through a resistor 23, a junction 73 and a diode CR10 to the junction 72. Junction 73 is directly connected to the gate of Q7. A capacitor C9 parallels the resistor R23.

In one successful embodiment of the invention the following components were used:

| | |
|---|---|
| R1, R3, R4, R14 | 10M ohms |
| R2 | 1M ohms |
| R5, R15, R18, R20 | 750 ohms |
| R6, R22 | 10K ohms |
| R7, R8 | 2.2K ohms |
| R9 | Thermistor |
| R10, R16, R19 | 68K ohms |
| R11 | 3.9K ohms |
| R12, R13 | 4.7M ohms |
| R17 | 1.6K ohms |
| R21 | 39K ohms |
| R23 | 2.2M ohms |
| R24 | 1.5K ohms |

| | |
|---|---|
| R25 | 470 ohms |
| C1, C4, C7, C10 | .01 μfd. |
| C2 | .1 μfd. |
| C3, C6 | 1.0 μfd. |
| C5, C8, C9 | .22 μfd. |

GENERAL DESCRIPTION OF OPERATION

Assume a call for heat indicated by the closing of switch 32 occurs, whereupon capacitor C3 in the timer is charged to maintain the lockout switch Q2 conductive so that spark ignition capacitor C6 may charge and by cyclically discharged to energize the high voltage transformer T1 and provide sparking at the spark plug 55. These sparks are seen by sensor 63 which is ultimately effective through a network including field effect transistor Q7 and thyristor Q6 to energize the solenoid 64 and open the gas valve 53 to admit gas to the burner 54. The gas is ignited by the spark and the resulting flame is then observed by sensor 63 to maintain the gas valve open. The flame also allows current to flow in the remote flame rectification sensor 59 which is effective to maintain a charge on capacitor C3 and to prevent the lockout switch from operating and in addition the capacitor C4 is charged to operate the ignition override switch by preventing conduction of Q4.

DETAILED OPERATION

Upon application of power to the circuit by the closure of switch 32, certain events occur in the circuit in succeeding half cycles of alternating current energization. In the following discussions, conductor 34 being grounded, a positive half cycle will be referred to as one in which conductor 35 is instantaneously positive with respect to conductor 34 and a negative half cycle one in which conductor 35 is negative with respect to the grounded conductor 34. The consideration of positive and negative half cycles is significant in the discussion to follow because of the nature of the various circuits which operate in one way during a given half cycle and in a different way on a succeeding half cycle. Upon application of power, capacitors C2 and C3 charge during the first positive half cycle by way of diode CR1 and the capacitors C3 and C2 being unequal in size, the voltages on the capacitors divide in the inverse ratio of their values whereupon C3 receives approximately 15 volts charge. This voltage makes the gate of transistor Q1 negative with respect to its source electrode, thus biasing it "off." In the case of this field effect transistor, "off," means that the transistor is able to pass current but only when the drain-source voltage is reversed, that is, the drain negative with respect to the source electrode which occurs when line 35 is positive. Thus it should be apparent that a current also flows from line 35 through transistor Q1 from source to drain, through capacitor C5 to charge the capacitor, and through resistor R6 and diode CR3 to ground.

On the succeeding half cycle, the negative half cycle, several additional events occur. Firstly, during this half cycle, and with a large potential on capacitor C3, the "off" biased transistor Q1 blocks preventing the capacitor C5 from discharging through it, however, the charge existing on capacitor C5 is effective to apply a turn on current to thyristor Q2 and this current may be traced from junction 41 at one plate of C5 through diode CR2, the trigger circuit of Q2, and through the network of resistors R8, R7 and R9 to the other plate of capacitor C5. With thyristor Q2 being switched on, the negative potential of conductor 35 is carried through to conductor 43 and a current path may be traced from the conductor 34 through diode CR4, resistor R10 and resistor R11 to conductor 43. The resistor R11 is parallel by the source-drain circuit of transistor Q3, this transistor now being in a conductive state. The current flowing through transistor Q3, also flows in the trigger circuit of thyristor Q4 triggering it on. A charging circuit has now been established for the capacitor C6 of the spark igniter circuit and this path may be traced from the conductor 34 through the diode CR5, the resistor R17, capacitor C6, thyristors Q4 and Q2, to negative conductor 35. The most predominant event occuring in this negative half cycle is the charging of capacitor C6. The spark ignition unit to be described below operates by sequentially charging the capacitor C6 and then discharging it through the spark transformer T1. During the negative half cycle, thyristor Q5 is not conductive because no gate voltage has been applied to it. In addition, current flows in a voltage double path comprising rectifying diode CR12 and capacitor C10 thus charging C10 by way of thyristor Q2 to a voltage approaching the peak voltage of the applied source.

The succeeding half cycle, a positive half cycle, sees the occurrence of spark at the spark plug 55. First of all a current flows from the positive conductor 35 through resistors R19, R18 and R16 to apply a turn on signal to the thyristor Q5 which then discharges capacitor C6 by way of the primary winding of the high voltage spark transformer T1. The high voltage induced in the secondary winding is causes to flow by means of conductors 61, 57 and 56, and across the spark gap 55 back to the transformer winding.

The ultraviolet sensitive element or optical sensor 63 is positioned to view the spark plug 65 and upon viewing the spark above-described, becomes conductive to cause a current to flow from conductor 35 through diode CR8, and bolstered by the potential on voltage doubler capacitor C10 through resistor R25, ultraviolet detector 63 and inductor L1 to conductor 34. The current paths described in the first positive half cycle are, of course, also active again during the present positive half cycle.

As the succeeding half cycle is about to begin, a negative half cycle, the energy stored in inductor L1 due to the current flowing therethrough, described above, now causes a current to flow through a loop circuit including capacitor C9, diode CR10 and diode CR11 thereby charging the capacitor C9 and biasing field effect transistor Q7 to a conductive condition. The reason for two diodes CR10 and CR11 is to enable the relatively low resistance of R24 to act as a load to the pulses from L1 without it providing a discharge path for C9. This is to absorb any pulses resulting from transients on the supply. The current may then be traced from conductor 34 through the transistor Q7, capacitor C8, resistor R22, diode CR9 and thyristor Q2 to the conductor 35 thereby charging capacitor C8. Capacitor C6 is also being recharged during this half cycle as has been previously described.

In the succeeding half cycle, a positive half cycle, the potential on capacitor C8 causes a current to flow through diode CR7, the gating circuit of thyristor Q6 and resistor R21 to trigger the thyristor Q6 into conduction. Current to the solenoid winding thus flows from conductor 35 through the solenoid winding 64 and thyristor Q6 to the conductor 34. Energizing of the solenoid 64 operates the gas valve 53 to admit fuel to the burner 54 whereupon the existing spark ignites the gas and the ensuing flame advances down the length of the burner.

As the flame reaches the end of the burner, the remote flame rectification sensor 59 which is in the flame becomes conductive and a current flows which is effective to perform two separate functions. The remote sensor detects the presence of a flame by the property of flame rectification, that is, the effect whereby the electrical conduction of the flame is not the same in both directions. The purpose of a remote sensor is to verify that the flame has reached the remote end of a long or large burner and not merely established itself in the region of the spark plug. When the remote sensor is employed, the spark plug is only concerned with ignition. Firstly, a current flows from conductor 35 through the timer circuit, resistor R1, conductors 47 and 62, and through flame sensor 59 to ground conductor 34. This current is effective to maintain a sufficient charge across capacitor C3 so that time out does not occur and thyristor Q2 remains conductive. Secondly, a current flows from the conductor 35 through capacitor C4 and resistor R3, conductors 47 and 62 and the sensor 59 to the ground conductor 34. The charge thereby developed on capacitor C4 is effective to turn off transistor Q3 which in turn prevents thyristor Q4 from conducting and since capacitor C6 can longer charge the spark ignition circuit is rendered inactive.

In other words, this signal derived from the remote flame rectification sensor is a half-wave rectified voltage which is negative in polarity. This negative voltage keeps capacitors C3 and C4 charged. A negatively charged capacitor C3 keeps semiconductors Q1 and Q2 operating as earlier explained thus preventing the system from going into lockout and a negatively charged capacitor C4 keeps Q3 and Q4 turned off thus turning off ignition after a flame is established.

If the flame rectification sensor does not produce the correct signal, the voltage on timer capacitor C3 will decay to the point where transistor Q1 is no longer biased off whereupon it becomes conductive in both directions and shorts out or bypasses the trigger or control circuit of thyristor Q2 so that thyristor Q2 is turned off or nonconductive and lockout occurs.

The various charging events explained above, normally occurring during the negative half cycles, that is, charging of capacitors C6, C8 and C10, is prevented by the lockout. The relay 64 then drops out closing the fuel valve means 53. Another way of explaining this action is that, when the timer capacitor C3 is sufficiently discharged by R4, Q1 will begin to conduct where before it did not. Thus C5 will not only charge as before but will discharge via Q1, depriving Q2 of its firing pulses. This condition is reached when the system goes into lockout. It should be noted that one of the self-checking features is at work here, the system is checking components on one half cycle and using then on the next.

The function of the spark plug is self-evident but it has another function under certain conditions which is not so obvious. If the remote flame rectification sensor is not used, then the spark plug 55 also takes on the job of flame rectification sensor. To put the system into this mode the jumper 57 (which shorts the internal spark gap and grounds one end of the spark coil) is removed. Now, when the spark plug 55 sparks, the internal spark gap 60 does too, doing what the jumper did, but between sparks the internal gap 60 represents an open switch, and the spark plug 55, via the ignition coil secondary winding and R12, is connected to the same point as was the previously described remote sensor. Thus spark plug 55 performs the additional job of flame sensing as well as being a spark plug. When it senses a flame and signals Q3 and Q4 to stop the spark, it continues to function as a flame sensor.

A number of safety functions result from the invention as described to this point. In the event of a nonfunctioning spark plug or circuit, no ultraviolet will become available to open the valve and lockout will result. In the event of open or short circuit to ground on the flame sensor, flame-rectifying action will not take place and lockout will result. If the flame fails, the flame sensor will signal the switch Q3 and Q4 to restart ignition and start the timer cycle. The gas valve will remain open by virtue of the spark ultraviolet. This sequence results in reignition or lockout if ignition does not take place. Thus one retrial for ignition is automatic and immediate.

If ultraviolet is lost due to flame out or no spark or to the sensor being obscured or to sensor failure, then the gas valve must close.

In the event of lockout occurring, the system is reset by switching off the power momentarily. On reestablishing power the system will go through its entire startup cycle. Thus power failure is made safe by virtue of its action of resetting the system.

I claim:

1. Burner control apparatus for use with a fuel burner unit, fuel valve means, spark ignition means, and two sensors comprising optical sensor means positioned to sense both spark and flame and flame rectification sensor means positioned to sense flame only, the control apparatus comprising:

ignition pulse-generating means having an input to initiate operation thereof, and having an output connected to the spark ignition means in energizing relation thereto;

electrical-switching means having an input circuit, an output circuit, terminals connected in circuit with said input circuit and adapted to be connected to the optical sensor means, and terminals connected in circuit with said output circuit and adapted to be connected to the fuel valve means in controlling relation thereto, so that upon the optical sensor means observing spark at the spark ignition means said electrical-switching means operates to cause the fuel valve means to open and admit fuel to the burner unit;

timed lockout control means connected to controllably supply electrical energy for a predetermined time period to said ignition pulse-generating means and said electrical-switching means, said lockout control means thereafter going into a lockout condition and effectively disconnecting said energy from said ignition pulse-generating means and said electrical-switching means; and lockout condition disabling means actuated upon the establishment of flame for preventing said lockout condition, said lockout condition disabling means having a control circuit adapted to be connected to the flame rectification sensor means and to be actuated thereby.

2. The apparatus of claim 1 and further comprising: ignition pulse override means actuated upon the establishment of flame for disabling said ignition pulse-generating means, said override means having control circuit adapted to be connected to the flame rectification sensor means and to be actuated thereby.

3. The apparatus in accordance with claim 1 wherein said timed lockout control means comprises:

semiconductor current switching means having a control circuit and an output circuit which may be biased to a conductive condition or to a lockout condition;

and timer means having an output connected in controlling relation to said semiconductor means control circuit, said timer means applying an output bias signal for a predetermined period of time to said switching means to maintain it in said conductive condition for said period of time.

4. The apparatus in accordance with claim 1 wherein said ignition pulse-generating means comprises:

capacitor storage means connected in said input and being repetitively charged during said predetermined time period from said electrical energy by way of said timed lockout control means;

and current-switching means and high voltage transformer means in said output and connected to said capacitor storage means whereby the operating of said switching means to a conductive condition discharges said capacitive means through said transformer means to cause a spark at said spark ignition means.

5. The apparatus in accordance with claim 4 wherein said current-switching means comprises a thyristor.

6. The apparatus in accordance with claim 2 wherein said ignition pulse override means comprises: semiconductor current control means connected in series with said input of said ignition pulse-generating means and normally providing electrical energy to said ignition pulse-generating means therethrough, the conductivity of said current control means being changed upon the establishment of flame.

7. Burner control apparatus for use with a fuel burner unit comprising:

spark ignition means; ignition pulse-generating means having an input to initiate operation thereof, and having an output connected to said spark ignition means in energizing relation thereto;

optical sensor means positioned to sense both spark of said spark ignition means and flame at the fuel burner unit;

fuel valve means;

electrical-switching means having an input circuit, an output circuit, terminals in circuit with said input circuit connected to said optical sensor means, and terminals in circuit with said output circuit connecting said electrical-switching means in controlling relation to said fuel valve means, so that upon said optical sensor means observing spark at said spark ignition means said electrical-switching means operates to cause said fuel valve means to open and admit fuel to the burner unit;

timed lockout control means connected to controllably supply electrical energy for a predetermined time period to said ignition pulse-generating means and said electrical-switching means, said lockout control means thereafter going into a lockout condition and effectively disconnecting said energy from said ignition pulse-generating means and said electrical-switching means;

flame rectification sensor means positioned to sense flame at the fuel burner unit;

and lockout condition-disabling means connected to said lockout control means and actuated upon the establishment of flame at said flame rectification sensor means for preventing said lockout condition, said lockout condition disabling means having a control circuit connected to said flame rectification sensor means and actuated thereby upon the establishment of flame.

8. Burner control apparatus for use with a fuel burner unit comprising:

spark ignition means positioned to initiate flame at the burner unit, said spark ignition means having a dual function and also operating as flame rectification sensor means to sense flame at the fuel burner unit;

ignition pulse-generating means having an input to initiate operation thereof, and having an output connected to said spark ignition means in energizing relation thereto;

optical sensor means positioned to sense both spark of said spark ignition means and flame at the fuel burner unit;

fuel valve means;

electrical-switching means having an input circuit, an output circuit, terminals in circuit with said input circuit connected to said optical sensor means, and terminals in circuit with said output circuit connecting said electrical switching means in controlling relation to said fuel valve means, so that upon said optical sensor means observing spark at said spark ignition means said electrical-switching means operates to cause said fuel valve means to open and admit fuel to the burner unit;

timed lockout control means connected to controllably supply electrical energy for a predetermined time period to said ignition pulse-generating means and said electrical switching means, said lockout control means thereafter going into a lockout condition and effectively disconnecting said energy from said ignition pulse-generating means and said electrical switching means; and lockout condition-disabling means connected to said lockout control means and actuated upon the establishment of flame at said flame rectification sensor means for preventing said lockout condition, said lockout condition-disabling means having a control circuit connected to said flame rectification sensor means and actuated thereby upon the establishment of flame.